(12) United States Patent
Adler et al.

(10) Patent No.: US 8,464,103 B2
(45) Date of Patent: Jun. 11, 2013

(54) GENERATING A FUNCTIONAL COVERAGE MODEL FROM A TRACE

(75) Inventors: Yoram Simha Adler, Haifa (IL); Noam Behar, Haifa (IL); Dale E. Blue, New York, NY (US); Orna X Orna Raz-Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/910,804

(22) Filed: Oct. 24, 2010

(65) Prior Publication Data

US 2012/0102365 A1     Apr. 26, 2012

(51) Int. Cl.
*G06F 11/00* (2006.01)
(52) U.S. Cl.
USPC .................................. 714/46; 714/45; 717/125
(58) Field of Classification Search
None
See application file for complete search history.

(56) References Cited

U.S. PATENT DOCUMENTS

| | | | |
|---|---|---|---|
| 6,647,513 B1* | 11/2003 | Hekmatpour | 714/37 |
| 6,658,416 B1* | 12/2003 | Hussain et al. | 1/1 |
| 7,703,076 B1* | 4/2010 | Kocot | 717/125 |
| 7,996,822 B2* | 8/2011 | Phillips | 717/128 |
| 8,001,427 B2* | 8/2011 | Sohm et al. | 714/45 |
| 2002/0174416 A1* | 11/2002 | Bates et al. | 717/128 |
| 2004/0123272 A1* | 6/2004 | Bailey et al. | 717/125 |
| 2005/0102572 A1* | 5/2005 | Oberlaender | 714/29 |
| 2007/0168727 A1* | 7/2007 | Fournier et al. | 714/25 |
| 2008/0126878 A1* | 5/2008 | Best et al. | 714/45 |
| 2011/0138363 A1* | 6/2011 | Schmelter et al. | 717/128 |
| 2012/0030515 A1* | 2/2012 | Birakoglu et al. | 714/38.1 |

* cited by examiner

*Primary Examiner* — Gabriel Chu (57) ABSTRACT

A functional coverage model may be generated based on a trace. The functional coverage model may comprise values of attributes. The values may be extracted from one or more entries comprised by the trace. Based upon a selection of a field of an exemplary entry, content of the corresponding fields in other entries may be extracted and utilized. In some exemplary embodiments, names of attributes may be extracted from the trace. In some exemplary embodiments, a reference trace may be utilized as a comparative baseline coverage by generating a functional coverage model based upon the reference trace and comparing coverage of a second trace in respect to the functional coverage model with the coverage of the reference trace.

17 Claims, 5 Drawing Sheets

GENERATING A FUNCTIONAL COVERAGE MODEL FROM A TRACE

BACKGROUND

The present disclosure relates to testing coverage in general, and to functional coverage, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase, a sample of all possible behaviors of the computerized device is inspected. Coverage tools for checking software provide a measure of how well the software being evaluated has been exercised during testing and thereby give a level of assurance that the software is of high quality.

There are a number of types of coverage known in the art, such as statement coverage, line coverage, condition coverage, path coverage, method coverage, and the like. One additional coverage method is functional coverage. Functional coverage is designed to measure amount, portion or a similar metric of tests that examined predetermined functional behaviors. Once functional coverage is measured, quality assurance (QA) personnel may design additional tests to examine untested behaviors.

Traditionally, the functional coverage model is defined by a QA staff member, an engineer, a programmer or the like. The functional coverage model comprises a set of attributes, each having a corresponding set of possible values. The functional coverage may define a set of coverage tasks, each comprising a combination of values of the different attributes. In some cases, each pair, triplet, quadruplet and the like of values of two attributes defines a coverage task.

Functional coverage checks coverage of coverage tasks in a trace. The trace comprises one or more entries, each entry indicative of a coverage task that was covered by a target device, system, program or the like (referred to hereinbelow as a target system). For example, each entry may describe a state of a transaction performed by the target system. The trace may be generated during execution of the target system. The entry may comprise values of functional coverage attributes. In some cases, some entries may not indicate a value of each attribute, but only for a portion.

The functional coverage model may further comprise a set of restrictions defining a series of values of different attributes that may not appear together. For example, consider a functional coverage defining two attributes: ACTION and USER. The ACTION attribute may be each of the following values: RETRIEVE, STORE, and MODIFY PERMISSION. The USER attribute may be each of the following values: ADMIN, USER, GUEST. In some cases, a guest user cannot modify permission. A restriction may be defined to indicate that the couple (GUEST, MODIFY PERMISSION) is not a valid couple. The fact that a trace does not comprise an entry covering a coverage task that includes the couple does not affect the functional coverage. In other words, all possible coverage tasks—which together form the maximal possible coverage in respect to a functional coverage—do not include any coverage task that comprises the restricted couple.

SUMMARY

One exemplary embodiment of the disclosed subject matter is a computer-implemented method for generating a functional coverage model, wherein the computer-implemented method is performed by a processor, the computer-implemented method comprising: obtaining a trace associated with a target system, the trace comprising at least one entry; parsing at least a portion of the at least one entry into fields; obtaining from a user at least: a first indication of a first field in an entry of the at least one entry; a second indication of a second field in the entry. Based on the first indication, generating a first set of values associated with a first attribute, wherein the first set of values are extracted from the first field in the at least one entry; based on the second indication, generating a second set of values associated with a second attribute, wherein the second set of values are extracted from the second field in the at least one entry; and generating the functional coverage model associated with the target system, the functional coverage model comprises functional attributes and corresponding values; wherein the functional attributes comprise the first attribute and the second attribute, wherein the corresponding values comprise the first set of values as corresponding to the first attribute and the second set of values as corresponding to the second attribute.

Another exemplary embodiment of the disclosed subject matter is a computerized apparatus for generating a functional coverage model, the computerized apparatus having a processor and storage device; the computerized apparatus comprising: a trace obtainer operative to obtain a trace associated with a target system, the trace comprising at least one entry; a trace parsing module operative to parse an entry of the at least one entry into fields; a values extractor operative to extract from a field in the at least one entry a set of values, the set of values is associated with an attribute, wherein said values extractor is responsive to a user's selection of the field from the fields; and a functional coverage model generator operative to generate the functional coverage model associated with the target system, the functional coverage model comprises functional attributes and corresponding values, wherein the functional attributes comprise the attribute, wherein the corresponding values comprise the set of values as corresponding to the attribute.

Yet another exemplary embodiment of the disclosed subject matter is a A computer program product for generating a functional coverage model, the product comprising: a computer readable medium; a first program instruction for obtaining a trace associated with a target system, the trace comprising at least one entry; a second program instruction for parsing at least a portion of the at least one entry into fields; a third program instruction for obtaining from a user at least a first indication of a first field in an entry of the at least one entry, and a second indication of a second field in the entry; a fourth program instruction for generating, based on the first indication, a first set of values associated with a first attribute, wherein the first set of values are extracted from the first field in the at least one entry; a fifth program instruction for generating, based on the second indication, a second set of values associated with a second attribute, wherein the second set of values are extracted from the second field in the at least one entry; a sixth program instruction for generating the functional coverage model associated with the target system, the functional coverage model comprises functional attributes and corresponding values; wherein the functional attributes comprise the first attribute and the second attribute, wherein the corresponding values comprise the first set of values as corresponding to the first attribute and the second set of values as corresponding to the second attribute; and wherein the first, second, third, fourth, fifth and sixth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to create a functional coverage model associated with a target system. Another technical problem dealt with by the disclosed subject matter is to compare coverage of the target system in respect to the functional coverage model based on a predetermined reference trace. Yet another technical problem is to enable creation of the functional coverage model by a non-expert user.

One technical solution is to generate a functional coverage model based on a trace. Values of attributes of the functional coverage model may be extracted from the trace. In some exemplary embodiments, a set of values, such as a range of continuous values, a group of predetermined values or the like, may be binned into a binned value, representative of the set of values, as is detailed elsewhere herein. In some exemplary embodiments, name of attributes may be extracted from the trace. Extraction from the trace may be performed based on a selection, or other indication, by a user, of a field of an exemplary entry of the trace. Another technical solution is to determine valid series of values of attributes of the functional coverage model based on the permutations appearing in the trace. An indication by a user may be useful to validate the determination or to render additional series as valid or non-valid. In some exemplary embodiments, restrictions may be added to the functional coverage model based on the valid or non-valid series. For example, restrictions may be added as to render each series that is not determined to be valid, as non valid. As another example, restrictions may be added as to restrict coverage of coverage tasks that comprise an invalid series. Yet another technical solution is to analyze functional coverage of the target system based on its traces and in respect to the generated functional coverage model, and to compare the functional coverage to that represented by a reference trace. A comparison of the different measurement of functional coverage may be displayed or otherwise provided to the user, such as indicating which coverage tasks defined by the functional coverage model are covered by a first trace but not by the other.

One technical effect of utilizing the disclosed subject matter is to enable generic generation of a functional coverage model by a layman. Another technical effect is comparing current coverage of the target system, as represented by a current trace, in respect to past coverage, as represented by a reference trace. The reference trace may comprise a set of past traces, a manually written trace defined by a developer, coverage specialist, or the like. Yet another technical effect is to determine a relatively large number of concrete values applicable to the functional coverage model in an automated manner, and based on an example trace.

Figure 1:
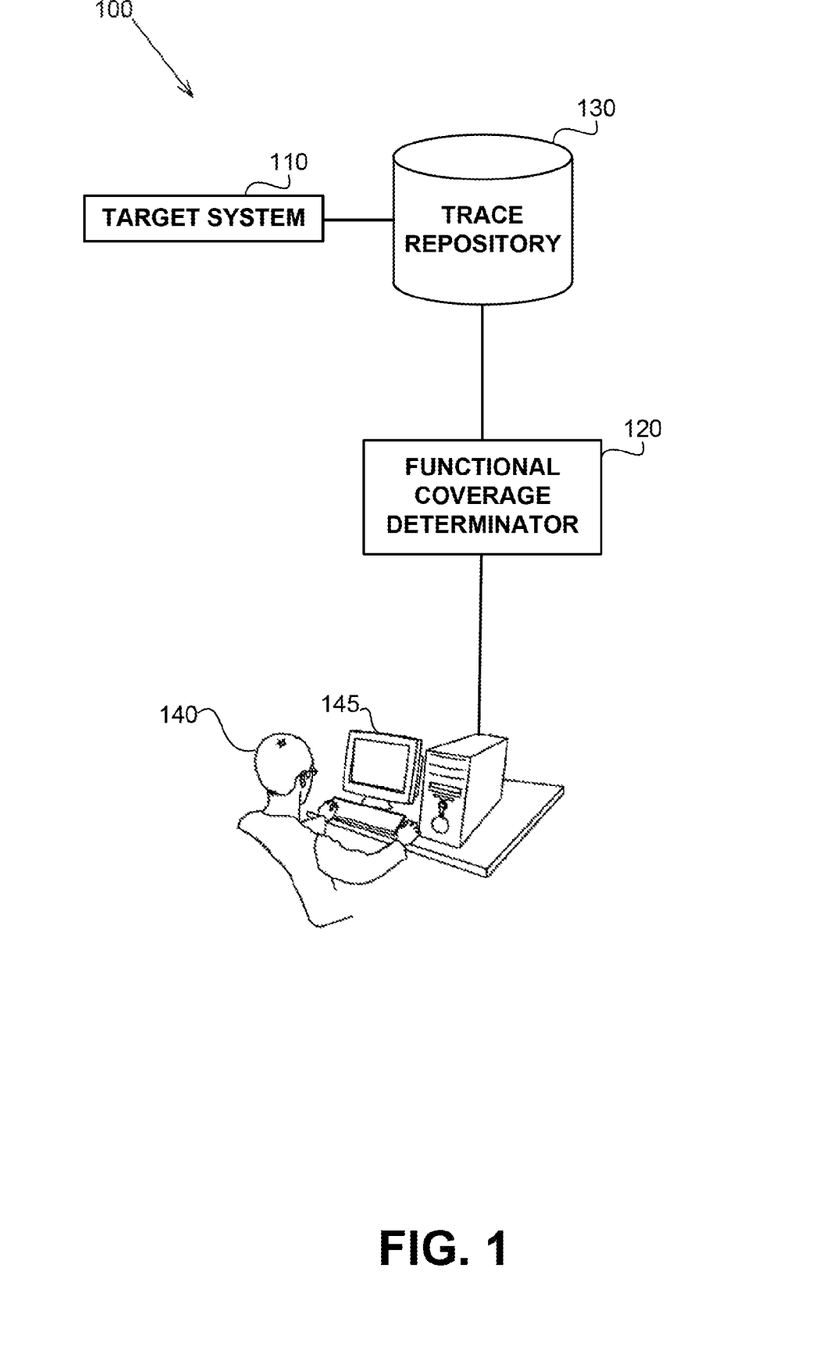
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

A computerized environment 100 may comprise a target system 110. Traces associated with the target system may be stored in a trace repository 122. In some exemplary embodiments, the traces may be generated and stored by the target system 110, by an auditing device (not shown) or the like. In some exemplary embodiments, the traces may comprise entries representative of a state of the target system 110 in a given time. In some exemplary embodiments, the trace may be for example log files. In some exemplary embodiments, the log file may be generated periodically, in predetermined times, on a regular basis or the like. In some exemplary embodiments, the log file may be generated in response to a predetermined operation of the target system 110, such as for example in case a condition is held, in response to an abnormal behavior, in response to a request by a user or the like.

In some exemplary embodiments, the trace repository 122 may be a storage system, a hard disk drive, a Flash disk, a Random Access Memory (RAM), a memory chip, a remote storage server, or the like capable of retaining one or more traces of the target system 110.

In some exemplary embodiments, a functional coverage model generator 120 may be configured to retrieve a trace and generate a functional coverage model based on the trace. In some exemplary embodiments, the functional coverage model generator 120 may retrieve the trace from the trace repository 122, from a reference trace repository 125 or the like. In some exemplary embodiments, the reference trace repository 125 may be a storage system, a hard disk drive, a Flash disk, a Random Access Memory (ROM), a memory chip, a remote storage server, or the like capable of retaining one or more traces of the target system 110. The reference trace repository 125 may retain a predetermined trace such as a reference trace used as a comparative baseline reference. In some exemplary embodiments, the functional coverage model generator 120 may generate the functional coverage model based on a plurality of traces. For example, the plurality of traces may be concatenated to a single trace. As another example, the plurality of traces may be treated as if they are concatenated into the single trace.

In some exemplary embodiments, the functional coverage model generator 120 may generate the functional coverage model based on values of fields within the trace. An indication by a user 140, such as a selection of a field, may be utilized to determine which field is useful for what purpose. In some exemplary embodiments, a first field may contain a value associated with an attribute, while a second field may comprise a name of the attribute. In some exemplary embodiments, a plurality of fields may comprise the value associated with the attribute. For example, a 'thread id' attribute may be composed of 4 bytes, where each byte resides in a different field in the trace.

In some exemplary embodiments, the user 140 may be a developer, a tester, a QA staff member, a coverage specialist or the like. The user 140 may interact with the computerized system 100 using a Man-Machine Interface (MMI) 145 such as a terminal, a display, a keyboard, an input device or the like. The user 140 may interact with the functional coverage model generator 120 such as by validating automated determinations of the generator 120, indicating a set of values to bin, viewing the generated functional coverage model or the like. In some exemplary embodiments, the user 140 may be capable of initiating operation of the target system 110, such as for example executing the target system 110.

In some exemplary embodiments, the functional coverage model generator 120 is configured to determine coverage tasks that are covered by the trace. For example, each entry of the trace may define one or more covered coverage task in a functional coverage model. The set of covered coverage tasks may be utilized as a baseline of the functional coverage model. In some exemplary embodiments, the trace comprises all coverable coverage tasks. In some exemplary embodiments, the trace comprises a portion of all coverage tasks that is deemed important for coverage analysis. In some exemplary embodiments, the user 140 may indicate how a coverage task is defined (e.g., which field comprises its various values, values of which attribute are comprised by which type of coverage task, and the like).

In some exemplary embodiments, a functional coverage determinator 130 may be operative to analyze functional coverage of the target system 110 in respect to the functional coverage model determined by the functional coverage model generator 120. In some exemplary embodiments, the functional coverage determinator 130 may determine the functional coverage based on traces retrieved from the trace repository 122. In some exemplary embodiments, the functional coverage determinator 130 may be operable to compare the coverage tasks covered by the trace and those covered by the reference trace that was used in generating the functional coverage model. In some exemplary embodiments, the functional coverage determinator 130 may display the results of the comparison to the user 140 using the MMI 145.

Figure 2:
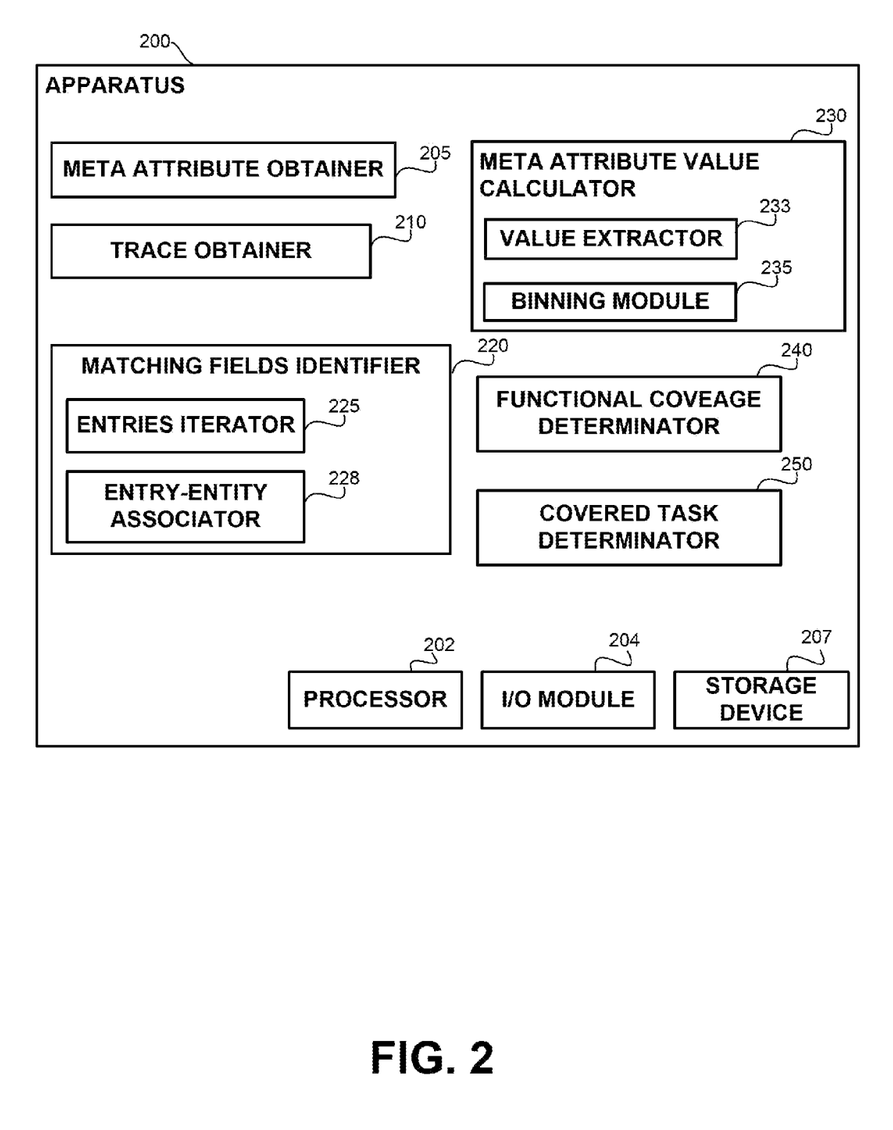
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 120 of FIG. 1, may be configured to determine and generate a functional coverage model based on an input trace.

In some exemplary embodiments, a trace obtainer 210 may be configured to retrieve, receive, or otherwise obtain at least one input trace. The input trace may be obtained, for example, from a trace repository such as a 122 or 125 of FIG. 1. The trace may comprise a plurality of entries, each indicative of functional operation of the target system. In some exemplary embodiments, the trace obtainer 210 may utilize an I/O module 205 to obtain the input trace. In some exemplary embodiments, the input trace may be a reference trace utilized as a comparative reference baseline.

In some exemplary embodiments, a trace parsing module 220 may be configured to parse an entry of the input trace into fields. The trace parsing module 220 may parse the entry into fields based on a predetermined separator such as a white space, a predetermined character or string and the like. In some exemplary embodiments, the predetermined separator may be a generally acceptable separator such as for example a white space or a colon. In some exemplary embodiments, the predetermined separator may be defined specifically for the input trace, such as by the user 140 of FIG. 1, in response to reviewing the input trace.

Figure 4:
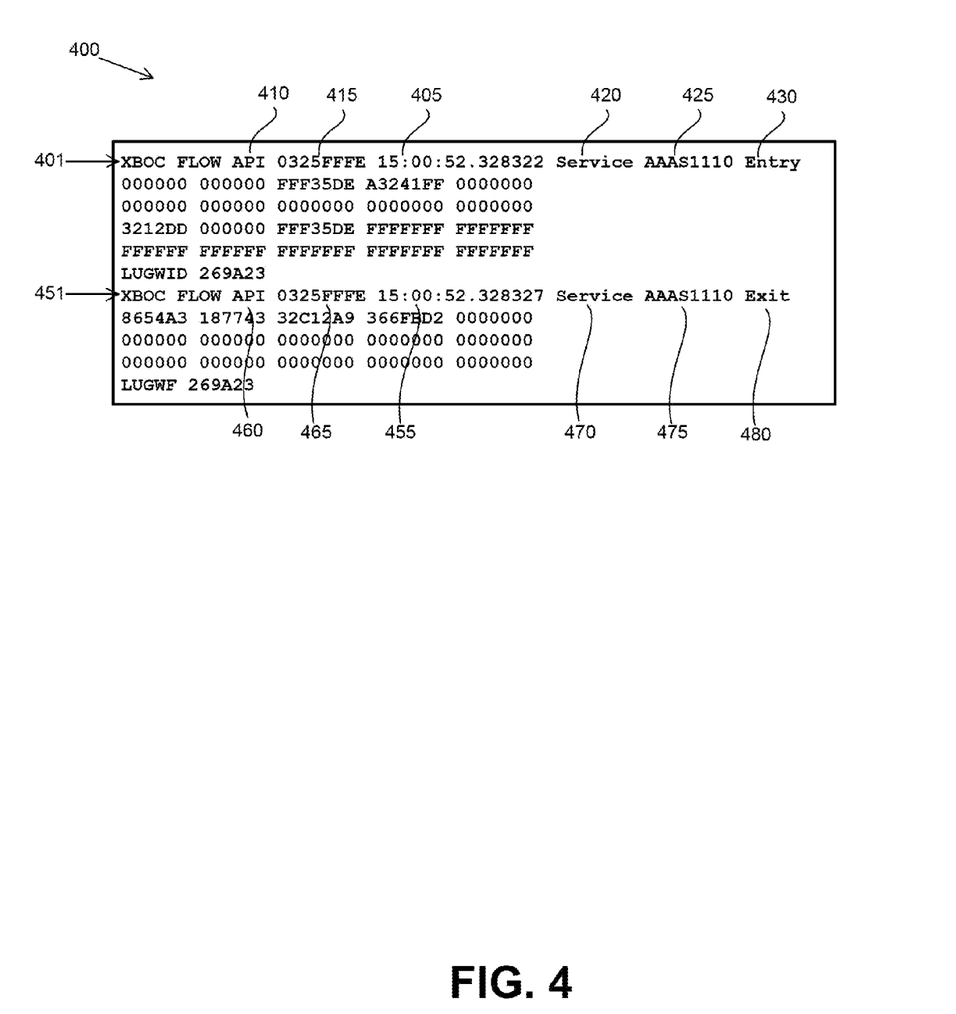
FIG. 4 shows an exemplary trace snippet, in accordance with some exemplary embodiments of the disclosed subject matter.

Consider a trace snippet 400 of FIG. 4, which shows a first entry 401 and a second entry 451. The trace parsing module 220 may be operative to parse the first entry 401 into fields, such as a first field containing XBOC, a second field containing FLOW, a third field containing API, a fourth field containing 0325FFFE, and so forth. The above example is used throughout the present disclosure for clarity of explanation. The disclosed subject matter is not limited to this example in any manner. Specifically, the disclosed subject matter is not limited to the format of the entries in this example.

In some exemplary embodiments, an entry identifier may be utilized to differentiate between two entries. For example, a timestamp in a field 405 may indicate the beginning of the first entry 401, while a timestamp in a field 455 may indicate the beginning of the second entry 451.

In some exemplary embodiments, a values extractor 230 may be configured to extract from a field of entries alternative values associated with a functional attribute. Referring again to the trace snippet 400 of FIG. 4, the values extractor 230 may be operative to extract values from the eighth field of an entity, such that Entry and Exit may be extracted from the eighth field 430 of the first entry and from the eighth field 480 of the second entry 451. In some exemplary embodiments, the values extractor 230 may respond to an input, such as from a user (e.g., 140 of FIG. 1). The input may indicate a field or set of fields to be utilized to extract a value associated with one or more attributes. For example, fields 415 and 425 of entry 401 of FIG. 4 may be indicated as comprising values of two different attributes. In response to such input, a set of values may be extracted from the entire trace from the corresponding fields in different entries, such as for example, fields 465 and 475 of the second entry 451 of FIG. 4. In some exemplary embodiments, a combination of values in two or more fields in the same entry may be utilized as a single value of a functional attribute.

In some exemplary embodiments, the input from the user utilized by the values extractor 230 may be a selection of a field out of the plurality of fields determined by the trace parsing module 220. In some exemplary embodiments, a display of the trace entry, or a similar output, may be provided to the user. The user may then utilize the display to select fields, and the selection may be provided to the values extractor 230.

In some exemplary embodiments, a binning module 235 may be operative to unify a plurality of values into a binned value. A binned value is a value that comprises a range or a set of other values. A binned value may be used to transform continuous values, such as for example Positive Real numbers, into a discrete set of values. For example, the three ranges [0..10], [11..100], and [100..∞] may be binned into three binned values. Generally, functional coverage models comprise only discrete values. Therefore, binning of values may be required in some cases to define the functional coverage model correctly and completely. A binned value may be used to unify together a number of separate values (either countable or not) into a single binned value. For example, the values 0-59 seconds may be binned into a single value "short". The binned value may be indicative of the values it comprises.

In some exemplary embodiments, an attributes extractor 240 may be operative to extract one or more names of attributes from an entry. For example, the field 410 may be utilized to extract a name of the functional attribute "API". In some exemplary embodiments, the selection of the field may be associated with a selection of a field that comprises values of the attribute. For example, the field 410 may be selected to indicate the name of the name of the attribute, whose value is set at the field 415. The name of the attribute may be utilized to verify correctness of the input, such as for example by extracting a value of a field corresponding to field 415 only in case the name of the attribute is the same. Consider, for example, the second entry 451. As the name of the attribute in field 460 is "API" the value in field 465 may be extracted as a value by the values extractor 230. In a similar manner, the field 420 may be utilized as the name of the attribute whose value is set in field 425.

In some exemplary embodiments, a name of an attribute may be generated automatically using the attributes extractor 240. In some exemplary embodiments, the name of the attribute may be randomly generated. In some exemplary embodiments, the name of the attribute may be determined by a user. In some exemplary embodiments, generated names of attributes may be optionally verified by the user.

In some exemplary embodiments, a functional coverage model generator 250 may be operative to generate a functional coverage model. Functional coverage models are known in the art. For example, refer to Grinwald et al. "User Defined Coverage—A Tool Supported Methodology for Design Verification" DAC 1998: 158-163 which is hereby incorporated by reference. The functional coverage model may be associated with the target system. The functional coverage model may comprise functional attributes defining a functional state of the target system. Functional attributes may, for example, define an Application Programming Interface (API) being utilized, a method of the API operating, a state within the operation, utilization of peripheral devices, operation of modules of the target system, an instance of an Operating System (OS) being used, an instance of an application being used (e.g., a Google® Chrome or a Microsoft® Internet Explorer as a web browser), and the like. For each functional attribute there may be a set of possible values. In some exemplary embodiments, the set of possible values are generated based on the values extracted by the values extractor 230. In some exemplary embodiments, the functional attributes are generated based on the attributes extracted by the attributes extractor 240. In some exemplary embodiments, the functional coverage model may define restrictions over combinations of values of different functional attributes. For example, the Internet Explorer web browser may not be operated using the Linux OS. A restriction of this couple may be defined to indicate the above. In some cases, the restricted combination of values may include two or more values of attributes.

In some exemplary embodiments, a valid series determinator 255 may be configured to determine a valid series of values. Valid series of values may be series of values which are not restricted in the functional coverage model. The valid series determinator 255 may determine a valid series based on series of values appearing in the trace. For example, based on the first entry 401, a valid series of API "0325FFFE", a service "AAAS1110" and a state "Entry" may be determined. As another example, based on the second entry 451, a valid series of API "0325FFFE", a service "AAAS1110" and a state "Exit" may be determined. In some exemplary embodiments, a portion of the series may be used (such as a couple, a triplet, or the like). In some exemplary embodiments, the valid series determinator 255 may generate restrictions to restrict any combination of values not determined to be a valid series.

In some exemplary embodiments, a user, such as 140 of FIG. 1, may review the valid series determined by the valid series determinator 255. The user may verify the correctness or a valid series, modify the valid series, delete a determined valid series, manually add a valid series, or the like.

In some exemplary embodiments, a functional coverage determinator 260, such as 130 of FIG. 1, may be operative to determine a functional coverage measurement based on the functional coverage model generated by the functional coverage model generator 250. The functional coverage determinator 260 may be operative to determine a functional coverage measurement of one or more traces, such as obtained by the trace obtainer 210 and/or the I/O module 205 from a trace repository, such as 122 of FIG. 1. The functional coverage determinator 260 may determine which of the coverage tasks that are defined by the functional coverage model is covered by the one or more traces. In some exemplary embodiments, the functional coverage determinator 260 may determine a percentile of coverage tasks that are covered by the one or more traces. For example, the traces may cover 20% of the coverage tasks. The measurement may indicate that further testing (using additional traces) is recommended. In some exemplary embodiments, the functional coverage determinator 260 may provide a list of covered coverage tasks and/or a list of uncovered coverage tasks.

In some exemplary embodiments, the functional coverage determinator 260 may determine that a restricted coverage task is covered by the one or more traces. A restricted coverage task may be a coverage task that included a series of values that are prohibited by a restriction of the functional coverage model.

In some exemplary embodiments, a comparison module 270 may be configured to compare a set of coverage tasks covered by the trace (in this paragraph, the second trace) with a baseline coverage. The baseline coverage may include coverage tasks covered by the trace utilized to generate the functional coverage model. In such a manner, the trace may be used as a baseline reference to which coverage tasks should or should not be covered. For example, in case one coverage task is covered in the reference trace but not in the second trace, this may indicate that further testing may be recommended to increase likelihood of correctness of the target system. As another example, coverage in the second trace of a coverage task that is not covered by the reference trace may indicate that the testing of the target system performed unexpected operations that may or may not be prohibited. In some exemplary embodiments, differences between coverage by the reference trace and the second trace may be indicative of problems. For example, values of an attribute that are only seen either in the reference trace(s) or in the compared trace(s) may suggest an error state. As another example, such comparison may be utilized to characterize execution in different environments. For example, comparing execution in a customer site or the like, to execution in a development site or the like.

In some exemplary embodiments, a display module 280 may be operative to provide a display or a similar output to the user, such as 140 of FIG. 1. The display may provide an indication of the comparison performed by the comparison module 270. For example, the display may include a list of coverage tasks covered by one trace and not by the other, a list of coverage tasks covered by both traces, a list of coverage tasks not covered by both traces, a percentage of coverage tasks in one or more of the aforementioned lists, or the like.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. The storage device 207 may retain a trace retrieved from a trace repository such as 122 or 125 of FIG. 1. The storage device 207 may retain the generated functional coverage model, functional coverage measurements, or the like.

Figure 3:
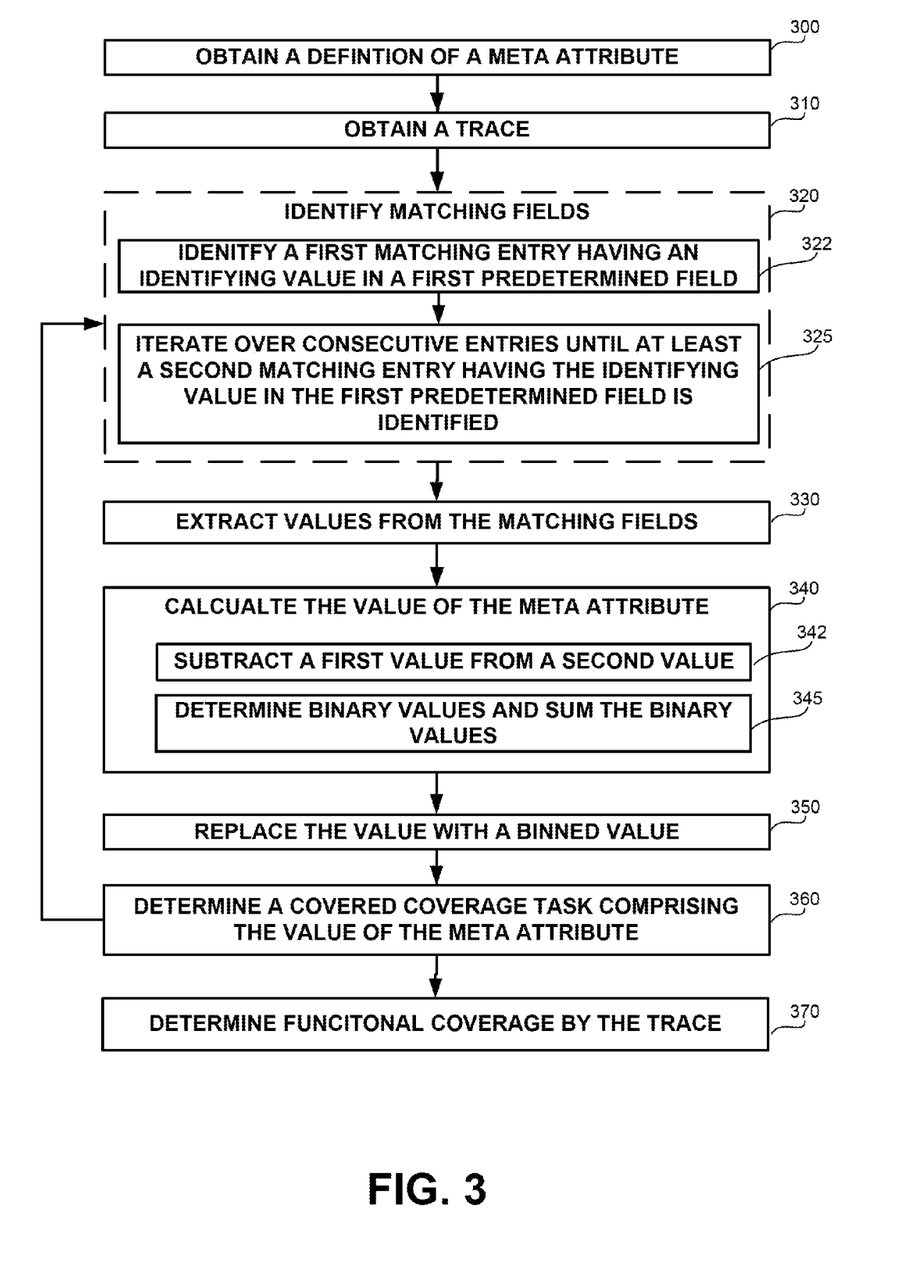
FIG. 3 shows a flowchart diagram of a method, in accordance with some exemplary embodiments of the disclosed subject matter.
Figure 3B:
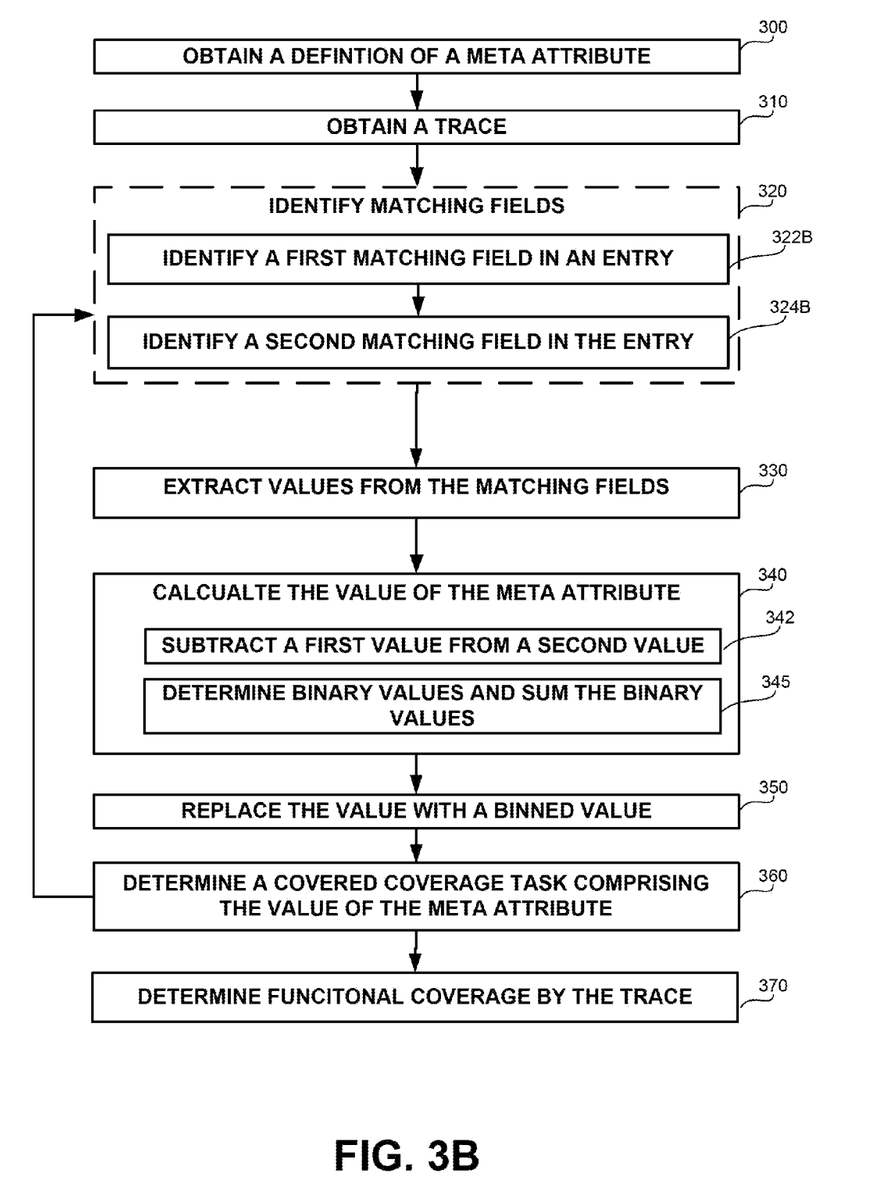

Referring now to FIG. 3 showing a flowchart diagram of a method in accordance with some exemplary embodiments of the disclosed subject matter.

In step 300, a trace may be obtained. The trace may be obtained from a trace repository such as for example 122 or 125 of FIG. 1. The trace may be obtained by a trace obtainer, such as 210 of FIG. 2.

In step 310, at least one entry of the trace may be parsed into fields. The entry may be parsed by a trace parsing module, such as 220 of FIG. 2. In some exemplary embodiments, a user, such as 140 of FIG. 1, may select an entry to be used in accordance with the disclosed subject matter. Based upon the user's selection, the selected entry may be parsed.

In step 320, a selection of fields by the user may be obtained. In some exemplary embodiments, the user may select two or more fields between the parsed fields of the entry. The user may, for example, utilize an MMI, such as 145 of FIG. 1. As an example, the user may select the field from a display of the parsed entry, wherein the MMI is responsive to a selection by the user from the display (such as using a pointing device, a touch screen, a keyboard, or the like). In some exemplary embodiments, the field selections may be of two kinds: selection of fields containing values and selection of fields containing attributes. Selections of value fields may be utilized in steps such as 330 and 340. Selections of attribute fields may be utilized in steps such as 350 and 360.

In step 330, in response to a selection of a first field by the user, values may be extracted from corresponding fields in the entries of the trace. The values may be extracted by a values extractor, such as 230 of FIG. 2. The selection may be a selection of a value field.

In step 340, in response to a selection of a second field by the user, values may be extracted from corresponding fields in the entries of the trace. The values may be extracted by a values extractor, such as 230 of FIG. 2. The selection may be a selection of a value field. In some exemplary embodiments, additional value fields may be selected and processed by extracting corresponding values.

In step 345, plurality of values may be grouped together into a binned value. The plurality of values may comprise values extracted from the trace in steps 330, 340 or the like. The plurality of values may comprise additional values, such as within a range, that were not, themselves, extracted from the trace. Binning of values may be performed by a binning module, such as 235 of FIG. 2.

In step 350, in response to a selection of first attribute field, a name of an attribute may be extracted from the parsed entry, from the trace, or the like. In some exemplary embodiments, the first attribute field may comprise the name of the attribute whose values were extracted from the first field and corresponding fields in other entries. The attribute name may be extracted by an attributes extractor, such as 240 of FIG. 2.

In a similar manner, in step 360, a selection of a second attribute field may initiate extraction of a second attribute name. The second attribute name may be associated with the values extracted in step 340. The second attribute name may be extracted by an attributes extractor, such as 240 of FIG. 2.

In step 370, a functional coverage model may be generated. The functional coverage model may comprise attributes and corresponding values. The attributes may comprise the first and second attribute extracted in steps 350 and 360. The corresponding values may be the values extracted or binned in steps 330, 340, 345 or the like. In some exemplary embodiments, the functional coverage model may be generated by a functional coverage model generator, such as 250 of FIG. 2. In some exemplary embodiments, user input may be utilized to add to the generated functional coverage model, such as for example determining names of attributes, adding values to attributes or the like In step 380, a set of valid series of values may be determined based on the coverage tasks covered by the trace that is obtained in step 300. In some exemplary embodiments, the set of valid series of values may be provided by a user, modified by a user or the like. The user may accept, reject, modify, or the like a valid series of values. The set of valid series may be determined by a valid series determinator, such as 255 of FIG. 2. In some exemplary embodiments, the set of valid series may be utilized to generate restrictions in the functional coverage model on series that is not deemed valid. In some exemplary embodiments, the set of valid series may be utilized to determine whether or not to bin values. In some exemplary embodiments, the set of valid series may be utilized to determine the binned values, each corresponding to a different portion of the set of valid series.

In step 390, a functional coverage measurement of a second trace may be determined. The second trace may be obtained from a trace repository, such as 122 of FIG. 1. The functional coverage measurement may be determined by a functional coverage determinator, such as 260 of FIG. 2.

In step 395, comparison may be performed between coverage tasks covered by the trace obtained in step 300 and coverage tasks covered by the second trace. In some exemplary embodiments, the comparison may be performed by a comparison module, such as 270 of FIG. 2. In some exemplary embodiments, a display or similar output may be provided to the user indicating the results of the comparison. The display may be provided by a display module, such as 280 of FIG. 2.

In some exemplary embodiments, the disclosed subject matter may be applied on a trace comprising of single entry. In such a trace, the functional model may be generated in accordance with the disclosed subject matter, based on attributes found in the single entry. A user, such as 140 of FIG. 1, may provide for a listing of alternative values of the attributes. In some exemplary embodiments, the user may add values in addition to the single value extracted from the single entry. In some exemplary embodiments, the user may determine the list of values on its own. The single entry trace may be useful to extract attribute names, determine nameless attributes and possibly automatically provide the nameless or named attributes with an exemplary value. In some exemplary embodiments, in case there are a large number of attributes, such as for example, twenty attributes, a single entry may be used to indicate each of the attributes using a field of the single entry.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for generating a functional coverage model, wherein the computer-implemented method is performed by a processor, the computer-implemented method comprising:
    obtaining a trace associated with a target system, the trace comprising at least one entry;
    parsing at least a portion of the at least one entry into fields;
    obtaining from a user at least:
        a first indication of a first field in an entry of the at least one entry;
        a second indication of a second field in the entry;
    based on the first indication, generating a first set of values associated with a first attribute, wherein the first set of values are extracted from the first field in the at least one entry;
    based on the second indication, generating a second set of values associated with a second attribute, wherein the second set of values are extracted from the second field in the at least one entry; and
    generating the functional coverage model associated with the target system, the functional coverage model comprises functional attributes and corresponding values; wherein the functional attributes comprise the first attribute and the second attribute, wherein the corresponding values comprise the first set of values as corresponding to the first attribute and the second set of values as corresponding to the second attribute.

2. The computer-implemented method of claim 1, further comprises:
    obtaining a second trace; and
    determining a functional coverage measurement of the second trace in respect to the functional coverage model.

3. The computer-implemented method of claim 2, further comprises:
    comparing coverage tasks covered by the second trace with coverage tasks covered by the trace; and
    displaying a display indicative of results of said comparing.

4. The computer-implemented method of claim 3, wherein said obtaining the trace comprises obtaining the trace from a reference trace repository.

5. The computer-implemented method of claim 1, wherein said generating the functional coverage model comprises:
    determining one or more valid series comprising at least values of the first attribute and the second attribute, wherein said determining the one or more valid series is based on series comprised by the trace.

6. The computer-implemented method of claim 1, wherein said generating the first set of values comprises binning a portion of the first set of values into a single value.

7. The computer-implemented method of claim 1, further comprises:
    obtaining from the user a third indication of a third field in the entry; and
    defining a name of the first attribute in the functional coverage model based on a content of the third field in the entry.

8. A computerized apparatus for generating a functional coverage model, the computerized apparatus having a processor and storage device; the computerized apparatus comprising:
    a trace obtainer operative to obtain a trace associated with a target system, the trace comprising at least one entry;
    a trace parsing module operative to parse an entry of the at least one entry into fields;
    a values extractor operative to extract from a field in the at least one entry a set of values, the set of values is associated with an attribute, wherein said values extractor is responsive to a user's selection of the field from the fields; and
    a functional coverage model generator operative to generate the functional coverage model associated with the target system, the functional coverage model comprises functional attributes and corresponding values, wherein the functional attributes comprise the attribute, wherein the corresponding values comprise the set of values as corresponding to the attribute.

9. The computerized apparatus of claim 8, wherein said values extractor is operative to extract a plurality of sets of values, wherein each of the plurality sets of values is associated with a different attribute; and wherein the corresponding values of the functional coverage model generated by said functional coverage model generator comprises the plurality sets of values.

10. The computerized apparatus of claim 8, further comprises:
    a functional coverage determinator operative to determine a functional coverage measurement in a second trace in respect to the functional coverage model, wherein the second trace is obtained by said trace obtainer.

11. The computerized apparatus of claim 10, further comprises:
    a comparison module operative to compare coverage tasks covered by the second trace with coverage tasks covered by the trace; and
    a display module operative to display a display indicative of comparison results of said comparison module.

12. The computerized apparatus of claim 11, wherein said trace obtainer is operative to retrieve the trace from a reference trace repository.

13. The computerized apparatus of claim 8, wherein said functional coverage model generator is operately coupled to a valid series determinator, wherein said valid series determinator is operative to determine one or more valid series of values of at least a portion of the functional attributes, wherein said valid series determinator is operative to determine the one or more valid series based on series comprised by the trace.

14. The computerized apparatus of claim 13, wherein said valid series determinator is further operative to determine the one or more valid series based on an indication from the user.

15. The computerized apparatus of claim 8, wherein said values extractor is operately coupled to a binning module, wherein said binning module is operative to unify a portion of the set of values into a binned value; and wherein said functional coverage model generator is operative to utilize the binned value.

16. The computerized apparatus of claim 8, further comprises:
    an attribute extractor operative to extract from a second field of the entry a name of the attribute, wherein said attribute extractor is responsive to the user's selection of the second field from the fields.

17. A computer program product for generating a functional coverage model, the product comprising:
- a non-transitory computer readable medium;
- a first program instruction for obtaining a trace associated with a target system, the trace comprising at least one entry;
- a second program instruction for parsing at least a portion of the at least one entry into fields;
- a third program instruction for obtaining from a user at least:
  - a first indication of a first field in an entry of the at least one entry;
  - a second indication of a second field in the entry;
- a fourth program instruction for generating, based on the first indication, a first set of values associated with a first attribute, wherein the first set of values are extracted from the first field in the at least one entry;
- a fifth program instruction for generating, based on the second indication, a second set of values associated with a second attribute, wherein the second set of values are extracted from the second field in the at least one entry;
- a sixth program instruction for generating the functional coverage model associated with the target system, the functional coverage model comprises functional attributes and corresponding values; wherein the functional attributes comprise the first attribute and the second attribute, wherein the corresponding values comprise the first set of values as corresponding to the first attribute and the second set of values as corresponding to the second attribute; and
- wherein said first, second, third, fourth, fifth and sixth program instructions are stored on said computer readable medium.

* * * * *